US009608389B2

United States Patent
Chen et al.

(10) Patent No.: US 9,608,389 B2
(45) Date of Patent: *Mar. 28, 2017

(54) AUDIO JACK WITH INCLUDED MICROPHONE

(71) Applicant: Apple Inc., Cupertino, CA (US)

(72) Inventors: Shaohai Chen, Cupertino, CA (US); Phillip George Tamchina, Mountain View, CA (US); Richard Hung Minh Dinh, San Jose, CA (US); Jae Han Lee, San Jose, CA (US); Trent Weber, Saratoga, CA (US); Michelle Yu, Oakland, CA (US); Adam D. Mittleman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 924 days.

This patent is subject to a terminal disclaimer.

(21) Appl. No.: 13/652,847

(22) Filed: Oct. 16, 2012

(65) Prior Publication Data
US 2013/0039508 A1 Feb. 14, 2013

Related U.S. Application Data

(63) Continuation of application No. 12/391,163, filed on Feb. 23, 2009, now Pat. No. 8,290,546.

(51) Int. Cl.
*H04R 9/08* (2006.01)
*H01R 24/58* (2011.01)
(Continued)

(52) U.S. Cl.
CPC ............ *H01R 24/58* (2013.01); *H01R 13/66* (2013.01); *H04M 1/03* (2013.01); *H04R 1/083* (2013.01);
(Continued)

(58) Field of Classification Search
None
See application file for complete search history.

(56) References Cited

U.S. PATENT DOCUMENTS 3,819,879 A    6/1974   Baechtold
4,336,861 A    6/1982   Peter
(Continued)

FOREIGN PATENT DOCUMENTS

CN    1922849    2/2007
EP    0489551    6/1992
(Continued)

OTHER PUBLICATIONS

Pending U.S. Appl. No. 13/630,672, filed Sep. 28, 2012, Nguyen et al.
(Continued)

*Primary Examiner* — Davetta W Goins
*Assistant Examiner* — James Mooney
(74) *Attorney, Agent, or Firm* — Kilpatrick Townsend & Stockton LLP

(57) ABSTRACT

A connector for receiving a cylindrical plug includes a body defining a plug aperture and a cavity for receiving the cylindrical plug. A plurality of electrical contacts in communication with the cavity make electrical connections with the cylindrical plug and retain the cylindrical plug. A microphone is coupled to the body such that the plug aperture and the cavity provide an acoustic path to the microphone. The microphone may be at an end of the connector opposite the plug aperture or on a side of the connector adjacent the plug aperture. The connector allows a microphone to be added to a device, such as a mobile telephone, without the need for an additional external aperture. The microphone in the connector may operate with a second microphone and processing
(Continued)

electronics in the device to provide audio processing functions such as noise cancellation or audio beamforming.

26 Claims, 2 Drawing Sheets

(51) Int. Cl.
| | |
|---|---|
| *H01R 13/66* | (2006.01) |
| *H04M 1/03* | (2006.01) |
| *H04R 1/08* | (2006.01) |
| *H01R 13/703* | (2006.01) |
| *H01R 105/00* | (2006.01) |

(52) U.S. Cl.
CPC ........ *H01R 13/703* (2013.01); *H01R 2105/00* (2013.01); *H01R 2201/16* (2013.01)

(56) References Cited

U.S. PATENT DOCUMENTS

| | | | |
|---|---|---|---|
| 5,012,890 A | 5/1991 | Nagi et al. | |
| 5,092,424 A | 3/1992 | Schreiber et al. | |
| 5,210,793 A | 5/1993 | Carlson et al. | |
| 5,226,076 A | 7/1993 | Baumhauer et al. | |
| 5,260,713 A | 11/1993 | Asai et al. | |
| 5,261,006 A | 11/1993 | Nieuwendijk et al. | |
| 5,282,245 A | 1/1994 | Anderson | |
| 5,471,019 A | 11/1995 | Maire | |
| 5,479,520 A | 12/1995 | Nieuwendijk et al. | |
| 5,627,901 A | 5/1997 | Josephson | |
| 5,642,404 A | 6/1997 | Hsu | |
| 5,701,354 A | 12/1997 | Komoda et al. | |
| 5,878,147 A | 3/1999 | Killion et al. | |
| 5,905,803 A | 5/1999 | Dou et al. | |
| 6,058,293 A | 5/2000 | Phillips | |
| 6,126,465 A * | 10/2000 | Franks, Jr. ............. | H01R 24/58 439/218 |
| 6,389,146 B1 | 5/2002 | Croft, III | |
| 6,411,711 B1 * | 6/2002 | Gancarcik ............. | H01R 24/58 379/420.03 |
| 6,473,625 B1 | 10/2002 | Williams et al. | |
| 6,614,911 B1 | 9/2003 | Watson et al. | |
| 6,681,023 B1 | 1/2004 | Turnbull et al. | |
| 6,728,386 B1 | 4/2004 | Anderson | |
| 6,758,303 B2 | 7/2004 | Zurek et al. | |
| 6,829,624 B2 | 12/2004 | Yoshida | |
| 6,868,602 B2 | 3/2005 | McCullough | |
| 6,965,790 B1 | 11/2005 | Mendolia | |
| 7,031,455 B2 | 4/2006 | Moquin et al. | |
| 7,069,061 B2 | 6/2006 | Gammon et al. | |
| 7,120,261 B1 | 10/2006 | Turnbull et al. | |
| 7,123,736 B2 | 10/2006 | Eaton | |
| 7,130,420 B2 | 10/2006 | Windeballe et al. | |
| 7,239,899 B2 | 7/2007 | Lin | |
| 7,252,549 B2 | 8/2007 | Nishio et al. | |
| 7,260,364 B2 | 8/2007 | Eaton | |
| 7,280,855 B2 | 10/2007 | Hawker et al. | |
| 7,426,280 B2 | 9/2008 | Aylward | |
| 7,536,211 B2 | 5/2009 | Saiki et al. | |
| 7,627,343 B2 | 12/2009 | Fadell et al. | |
| 7,840,740 B2 | 11/2010 | Minoo | |
| 8,103,029 B2 | 1/2012 | Ngia et al. | |
| 8,126,138 B2 | 2/2012 | Dinh et al. | |
| 8,170,256 B2 | 5/2012 | Enstad et al. | |
| 8,224,012 B2 | 7/2012 | Watson et al. | |
| 8,306,252 B2 | 11/2012 | Dinh et al. | |
| 8,447,054 B2 | 5/2013 | Bharatan et al. | |
| 8,483,776 B2 * | 7/2013 | Murray ..................... | 455/570 |
| 2002/0076041 A1 | 6/2002 | Hietanen | |
| 2003/0179894 A1 | 9/2003 | Saltykov | |
| 2004/0204185 A1 * | 10/2004 | Snyder et al. ............. | 455/574 |
| 2005/0265572 A1 * | 12/2005 | Hu ............................. | 381/384 |
| 2006/0115103 A1 * | 6/2006 | Feng ..................... | H04R 1/406 381/313 |
| 2007/0026905 A1 * | 2/2007 | Murray ..................... | 455/570 |
| 2007/0237339 A1 * | 10/2007 | Konchitsky .............. | 381/91 |
| 2008/0123891 A1 | 5/2008 | Kato et al. | |
| 2008/0149417 A1 | 6/2008 | Dinh et al. | |
| 2011/0272769 A1 | 11/2011 | Song et al. | |
| 2012/0204650 A1 | 8/2012 | Kleven | |
| 2013/0064390 A1 | 3/2013 | Dinh et al. | |
| 2014/0093114 A1 | 4/2014 | Nguyen et al. | |
| 2014/0133687 A1 | 5/2014 | Lee | |
| 2014/0226826 A1 | 8/2014 | Utterman et al. | |

FOREIGN PATENT DOCUMENTS

| | | |
|---|---|---|
| EP | 0840396 | 5/1998 |
| EP | 1128489 | 8/2001 |
| JP | 2001211089 | 8/2001 |
| JP | 2006292882 | 10/2006 |
| WO | WO 00/76181 | 12/2000 |
| WO | WO02/34006 | 4/2002 |

OTHER PUBLICATIONS

Pending U.S. Appl. No. 13/670,093, filed Nov. 6, 2012, Dinh et al.
Pending U.S. Appl. No. 13/767,503, filed Feb. 14, 2013, Utterman et al.

* cited by examiner

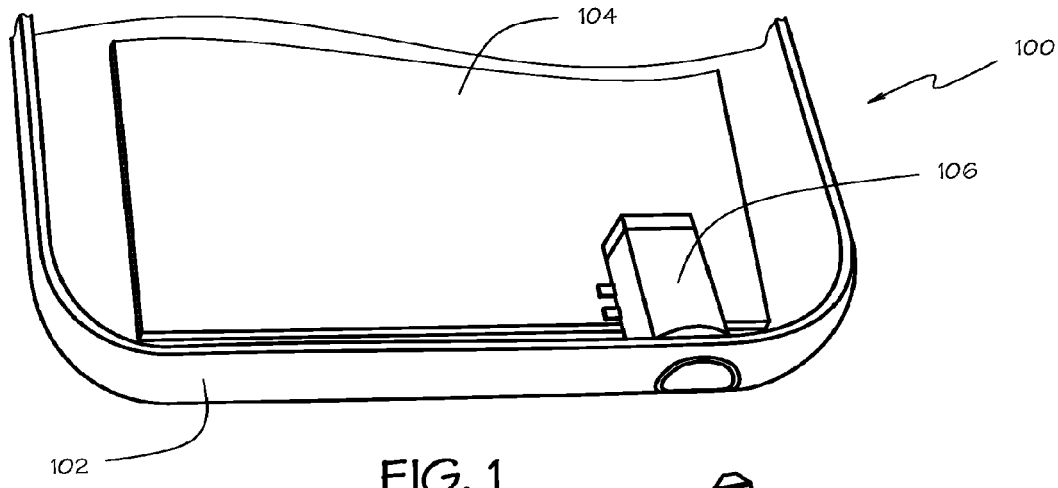
FIG. 1
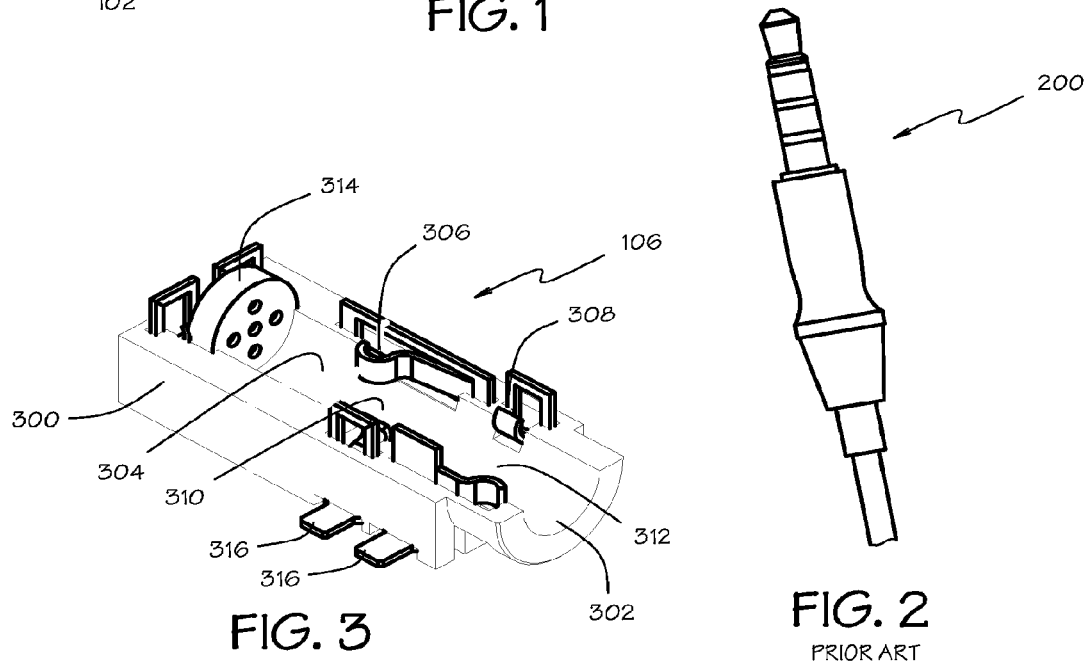
FIG. 3
FIG. 2
PRIOR ART
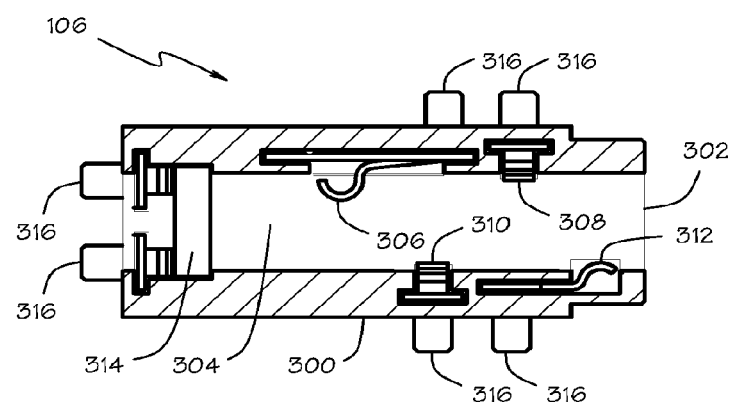
FIG. 4

AUDIO JACK WITH INCLUDED MICROPHONE

CROSS REFERENCE TO RELATED APPLICATIONS

This application is a continuation patent application of U.S. patent application Ser. No. 12/391,163, filed Feb. 23, 2009 and titled "Audio Jack with Included Microphone," the disclosure of which is hereby incorporated here in its entirety.

BACKGROUND

Field

Embodiments of the invention relate to the field of electrical connectors; and more specifically, to electrical connectors that include a microphone.

Background

Handheld computing devices, "palmtops", "palmhelds", personal digital assistants (PDAs), or handheld computers typically weigh less than a pound and fit in a pocket. These handhelds generally provide some combination of personal information management, database functions, word processing, and spreadsheets as well as voice memo recording and telephony functions. Because of the small size and portability of handhelds, strict adherence to hardware constraints, such as input hardware, must be maintained. It is conventional to have buttons or switches on the handheld computer for providing user input to the handheld computer. Handheld computers may also include one or more electrical connectors that provide for connecting auxiliary devices to the handheld computer.

If the handheld computer includes a microphone, a sound input aperture is conventionally located at some discrete location on the handheld computer housing, using limited housing real estate on the handheld computer. Other conventional implementations of sound input devices for handheld computers include external microphone devices that may be plugged into an electrical connector. In addition to using housing real estate, sound input apertures and electrical connectors introduce openings in the housing and breach the barrier that protects components inside the housing.

Accordingly, there is a need to minimize the requirement for openings in a housing of a handheld device to accommodate microphones and electrical connectors.

SUMMARY

A connector for receiving a cylindrical plug includes a body defining a plug aperture and a cavity for receiving the cylindrical plug. A plurality of electrical contacts in communication with the cavity make electrical connections with the cylindrical plug and retain the cylindrical plug. A microphone is coupled to the body such that the plug aperture and the cavity provide an acoustic path to the microphone. The microphone may be at an end of the connector opposite the plug aperture or on a side of the connector adjacent the plug aperture. The connector allows a microphone to be added to a device, such as a mobile telephone, without the need for an additional external aperture. The microphone in the connector may operate with a second microphone and processing electronics in the device to provide audio processing functions such as noise cancellation or audio beamforming.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 1 is a pictorial view of a portion of a handheld device that embodies the invention.

FIG. 2 illustrates a cylindrical plug that may be used with the invention.

FIG. 3 is a pictorial view of a portion of a connector that embodies the invention.

FIG. 4 is a plan view of the connector shown in FIG. 3.

DETAILED DESCRIPTION

Figure 5:
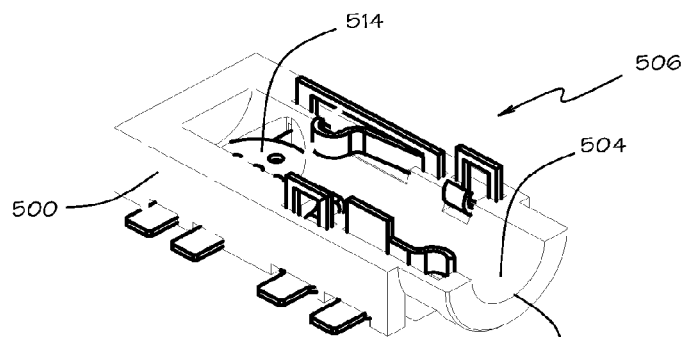
FIG. 5 is a pictorial view of a portion of another connector that embodies the invention.

In the following description, numerous specific details are set forth. However, it is understood that embodiments of the invention may be practiced without these specific details. In other instances, well-known circuits, structures and techniques have not been shown in detail in order not to obscure the understanding of this description.

FIG. 1 is a pictorial view of a portion of a handheld device 100 that embodies the invention. The handheld device 100 includes a housing 102 which may be formed in two or more parts. The figure shows a portion of a lower part of the housing. An upper part of the housing that would be provided to close the handheld device is not shown to allow the invention to be seen more clearly.

A portion of a printed circuit board 104 that is supported by the housing 102 is shown. The printed circuit board 104 may support and electrically connect processing electronics that provide functions for the handheld device 100. The handheld device 100 further includes a connector 106 for receiving a cylindrical plug.

FIG. 2 illustrates a cylindrical plug 200 that is typical of the type of plug that may be received by the connector 106. Such connectors are well known and are frequently used to electrically connect audio devices such as microphones and headphones.

FIG. 3 is a pictorial view of a portion of the connector 106. FIG. 4 is a plan view of the connector 106. The connector includes a body 300, the upper portion of which is not shown to allow the invention to be seen more clearly. The body 300 defines an aperture 302 and a cavity 304 for receiving the cylindrical plug 200.

A plurality of electrical contacts 306, 308, 310, 312 are in communication with the cavity 304 of the connector 106. While four electrical contacts are shown, it will be appreciated that the connector may have other numbers of electrical contacts. The plurality of electrical contacts make electrical connections with the cylindrical plug 200 when it is received in the cavity 304. At least one of the electrical contacts 306 mechanically engages and retains the cylindrical plug 200 when received in the cavity 304 of the connector 106.

A microphone 314 is coupled to and supported by the body 300 such that the aperture 302 and the cavity 304 provide an acoustic path to the microphone. The connector 106 includes a plurality of electrical terminals 316 that provide electrical connections to the plurality of electrical contacts 306, 308, 310, 312 and to the microphone 314. The connector 106 may be a surface mount device (SMD) in which the plurality of plurality of electrical terminals 316 are surface mount terminals as shown. Other forms of terminals, such as through hole terminals, may be used. While the body 300 is shown with an exterior surface that is a substantially rectangular solid, it will be appreciated that the body may be of other shapes.

The aperture 302 may be at a first end of the cavity 304 and the microphone 314 may be supported by the body 300 at a second end of the cavity opposite the first end as shown in FIGS. 3 and 4. In other embodiments, the microphone may be supported by the body in other positions.

Figure 6:
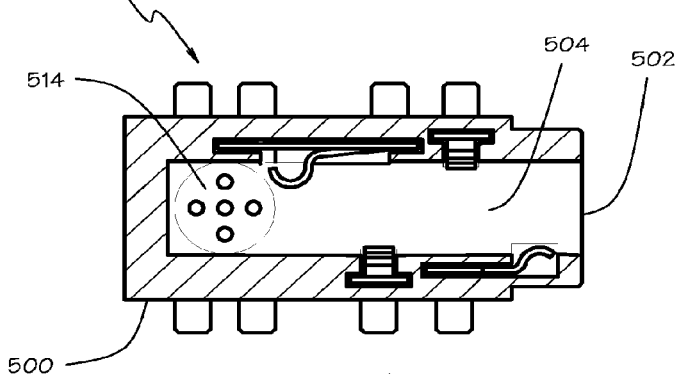
FIG. 6 is a plan view of the connector shown in FIG. 5.

FIG. 5 is a pictorial view and FIG. 6 is a plan view of another connector 506 that embodies the invention. The connector 506 includes a body 500, the upper portion of which is not shown to allow the invention to be seen more clearly. The body 500 defines an aperture 502 and a cavity 504 for receiving the cylindrical plug 200. The aperture 502 is defined in an end face of the body 500, and the microphone 514 is supported by a side face of the body that is adjacent the end face. While the microphone is illustrated as being supported in the bottom face, which would be against a supporting circuit board, it will be appreciated that the microphone may be supported by any of the faces of the body of the connector. It will be further appreciated that, while the microphone is illustrated as being supported near the second end of the cavity opposite the first end that includes the aperture, the microphone may be supported at a position that is closer to, even adjacent, the first end of the body.

Figure 7:
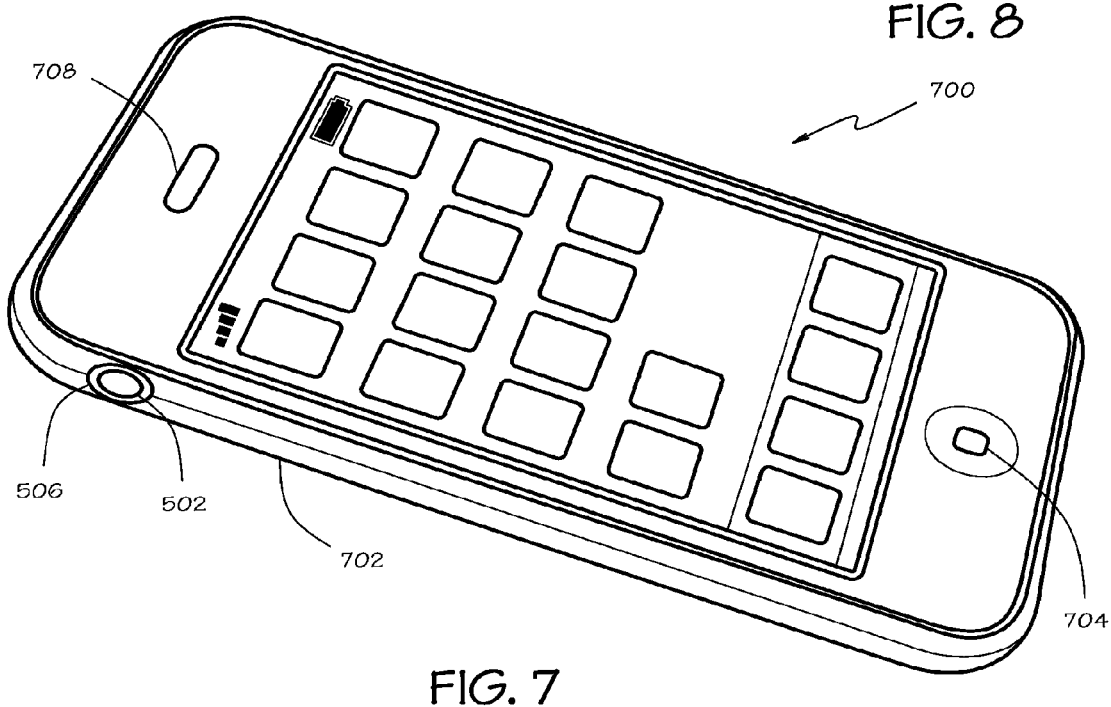
FIG. 7 is a pictorial view of a handheld device that embodies the invention.

FIG. 7 shows a handheld device 700 that embodies the invention. The handheld device 700 may be configured for telephony, such as a device that can function as a cellular telephone. The handheld device 700 includes a housing 702, processing electronics (not visible) supported by the housing, and an electrical connector 506 supported by the housing and electrically coupled to the processing electronics. The connector 506 has a plug aperture 502 and a cavity 504 for receiving a cylindrical plug 200 as illustrated in FIGS. 2 and 5. A microphone 514 is disposed in the connector 506. The microphone 514 and the plug aperture 502 are acoustically coupled by the cavity 504. The microphone 514 is electrically coupled to the processing electronics. The microphone 514 may be mechanically supported by the electrical connector 506. The electrical connector 506 may provide connectivity for an external device such as an earphone, an external microphone, or a power supply.

The electrical connector 506 includes a plurality of electrical contacts 506, 508, 510, 512 in communication with the cavity 504. The plurality of electrical contacts make electrical connections with the cylindrical plug 200 when received in the cavity 504. At least one of the electrical contacts 506 mechanically engages and retains the cylindrical plug 200 when received in the cavity 504.

The electrical connector 506 may include a plurality of electrical terminals 516 that provide electrical connections to the plurality of electrical contacts 506, 508, 510, 512 and to the microphone 514. The electrical connector 506 may be a surface mount device (SMD) in which the plurality of plurality of electrical terminals 516 are surface mount terminals. The electrical connector 506 may allow the connector and included microphone to be conveniently assembled to the printed circuit board of the processing electronics as a single assembly.

The handheld device 700 may further include a second microphone 704 electrically coupled to the processing electronics. A variety of audio enhancements may be performed using two microphones such as audio beamforming, noise suppression, noise cancellation, echo cancellation, and sound source localization.

Audio beamforming may use the audio input of the two microphones to provide an aimable directional input, which may be advantageous if the handheld device is used as a speakerphone or recording device for a sound source at some distance from the handheld device 700.

Noise suppression may use the audio input of the two microphones to estimate the voice signal of the user speaking into the device and then suppress everything else.

Figure 8:
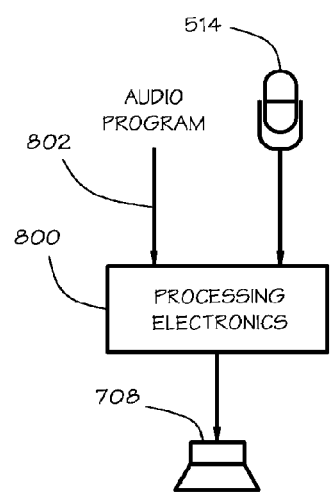
FIG. 8 is a block diagram of processing electronics that may be used for noise cancellation.

FIG. 8 is a block diagram of processing electronics 800 that may be used for noise cancellation. The audio signal generated by the microphone 514 disposed in the connector 506 may provide an approximation of the ambient noise that is combined with an audio program signal which is then provided to a speaker 708. The processing electronics 800 may generate an out of phase approximation of the ambient noise that is added to the audio signal provided to the device speaker 708 to cancel the ambient noise heard by the user.

Noise cancellation may also use the audio input of the first microphone 514 to estimate the noise signal affecting the device 700 and then cancel the noise in the audio signal generated by the user speaking into the second microphone 704. The processing electronics 800 may generate an out of phase approximation of the ambient noise that is added to the audio signal received from the second microphone 704 to cancel the noise in the received speech signal.

Acoustic echo cancellation may use the audio input of the two microphones to estimate and cancel the acoustic signal being picked up by the microphones 506, 704 from the device speaker 708.

Sound source localization may use the audio input of the two microphones to estimate to position of a sound source; sound source localization may be used to aim audio beamforming.

The second microphone 704 may be connected to the outside of the housing 702 of the device 700 by a second acoustic path which passes through the housing at a substantial distance from the plug aperture 502. Having the first and second microphone openings spaced apart on the housing may be advantageous for performing audio enhancements using two microphones. For example, it may be desirable to locate the two microphones adjacent the two opposing ends along the length of the device 700. In a typical audio beamforming application, the microphone spacing determines the cut-off frequency. The smaller the distance, the higher the cut-off frequency, with the distance equal to one-half the wavelength at the cut-off frequency. Some noise suppression algorithms require a larger microphone spacing so the voice signal and background noise signal can be well separated.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A connector for receiving a cylindrical plug, the connector comprising:

a body defining a cavity for receiving the cylindrical plug along an insertion direction;

a plurality of electrical contacts in communication with the cavity, the plurality of electrical contacts configured to electrically connect with the cylindrical plug when the cylindrical plug is received in the cavity, at least one of the electrical contacts configured to mechanically engage and retain the cylindrical plug when the cylindrical plug is received in the cavity; and a microphone supported by the body and having a sensing face with a center axis that is transverse to the insertion direction, the microphone being positioned such that the sensing face is at least partially covered by a side of the cylindrical plug that is parallel to the insertion direction when the cylindrical plug is received in the cavity.

2. The connector of claim 1, wherein the microphone is supported by the body.

3. The connector of claim 2, wherein the connector includes a plurality of electrical terminals that provide electrical connections to the plurality of electrical contacts and to the microphone.

4. The connector of claim 3, wherein the connector is a surface mount device (SMD) and the plurality of electrical terminals are surface mount terminals.

5. The connector of claim 2, wherein an aperture is at a first end of the cavity and the microphone is supported by the body at a second end of the cavity opposite the first end.

6. The connector of claim 5, wherein the body is substantially a rectangular prism, the aperture is defined in an end face of the rectangular prism, and the microphone is supported by a side face of the rectangular prism that is adjacent the end face.

7. A handheld device, comprising:
a housing;
processing electronics supported by the housing;
an electrical connector supported by the housing and electrically coupled to the processing electronics, the connector having a plug aperture and a cavity for receiving a cylindrical plug, the cavity defined by:
an end wall opposite the plug aperture; and
a sidewall extending at least partially between the plug aperture and the end wall; and
a microphone disposed on the sidewall of the cavity and electrically coupled to the processing electronics, the microphone and the plug aperture being acoustically coupled by the cavity.

8. The handheld device of claim 7, wherein the microphone is supported by the electrical connector.

9. The handheld device of claim 8, wherein:
the electrical connector includes a plurality of electrical contacts in communication with the cavity;
the plurality of electrical contacts form electrical connections with the cylindrical plug when the cylindrical plug is received in the cavity; and
at least one of the electrical contacts mechanically engages with and retains the cylindrical plug when the cylindrical plug is received in the cavity.

10. The handheld device of claim 9, wherein the electrical connector includes a plurality of electrical terminals that form electrical connections with the plurality of electrical contacts and with the microphone.

11. The handheld device of claim 10, wherein the electrical connector is a surface mount device (SMD) and the plurality of plurality of electrical terminals are surface mount terminals.

12. The handheld device of claim 7, wherein the microphone is a first microphone, the handheld device further comprising a second microphone electrically coupled to the processing electronics, wherein the processing electronics perform at least one of audio beamforming, noise suppression, noise cancellation, echo cancellation, and sound source localization using input from the first and second microphones.

13. The handheld device of claim 7, further comprising a speaker electrically coupled to the processing electronics, wherein the processing electronics perform noise cancellation by combining input from the first microphone with a signal provided to the speaker.

14. The handheld device of claim 7, wherein the handheld device is configured for telephony.

15. A communication device comprising:
a housing;
an electrical connector supported by the housing and defining a cavity configured to receive a plug; and
a microphone disposed on a first interior surface of the cavity and positioned such that a sensing portion of the microphone faces a second interior surface of the cavity opposite the first interior surface.

16. The communication device of claim 15, wherein the microphone is disposed on a sidewall of the cavity.

17. The communication device of claim 16, wherein the sidewall is a cylindrical sidewall, and the first and second interior surfaces are portions of the cylindrical sidewall.

18. The communication device of claim 15, wherein the microphone is a first microphone, the communication device further comprising a second microphone connected to the outside of the housing of the device by a second acoustic path which passes through the housing apart from the electrical connector.

19. The communication device of claim 18, further comprising processing electronics supported by the housing and electrically coupled to the electrical connector, the first microphone, and the second microphone, the processing electronics to perform at least one of audio beamforming, noise suppression, noise cancellation, echo cancellation, and sound source localization using input from the first and second microphones.

20. The communication device of claim 15, further comprising a speaker and processing electronics supported by the housing and electrically coupled to the electrical connector, the microphone, and the speaker, the processing electronics to perform noise cancellation by combining input from the microphone with a signal provided to the speaker.

21. The communication device of claim 15, wherein:
the electrical connector is configured to receive a cylindrical plug;
the connector includes a plurality of electrical contacts configured to form electrical connections with the cylindrical plug when the cylindrical plug is received in the cavity; and
at least one of the plurality of electrical contacts mechanically engages with and retains the cylindrical plug when the cylindrical plug is received in the cavity.

22. The communication device of claim 15, wherein the communication device is configured for telephony.

23. The communication device of claim 15, wherein:
the microphone is a first microphone; and
the communication device further comprises a second microphone.

24. The communication device of claim 23, further comprising processing electronics electrically coupled to the first and second microphones and configured to:

receive electrical signals from both the first and the second microphones, the electrical signals representing acoustic signals originating from a sound source; and estimate, using the electrical signals, a position of the sound source relative to the communication device.

25. The communication device of claim 23, further comprising processing electronics electrically coupled to the first and second microphones and configured to:

receive, from the first microphone, a first electrical signal representing at least ambient noise proximate the communication device;

receive, from the second microphone, a second electrical signal representing at least an audio input from a user combined with the ambient noise; and modify the second electrical signal to remove at least a portion of the ambient noise therefrom.

26. The communication device of claim 23, further comprising:

a speaker; and processing electronics electrically coupled to the first and second microphones and configured to:

receive, from the first and second microphones, an electrical signal representing sound produced by the speaker and sound produced by another source; and modify the electrical signal to remove at least a portion of the sound produced by the speaker.

\* \* \* \* \*